(12) United States Patent
Brignone et al.

(10) Patent No.: US 7,398,090 B2
(45) Date of Patent: Jul. 8, 2008

(54) DEFINING A SMART AREA

(75) Inventors: Cyril Brignone, Mignaloux Beauvoir (FR); Salil V. Pradhan, Santa Clara, CA (US); Marc McMeachern, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 838 days.

(21) Appl. No.: 10/242,366

(22) Filed: Sep. 13, 2002

(65) Prior Publication Data

US 2004/0053645 A1  Mar. 18, 2004

(51) Int. Cl.
*H04Q 7/20* (2006.01)
*H04M 3/42* (2006.01)

(52) U.S. Cl. .................. 455/446; 455/414.1; 455/456.3

(58) Field of Classification Search ................ 455/422, 455/426, 448, 404.2, 456.1, 456.2, 456.3, 455/457, 422.1, 446, 414.2, 414.1, 418; 370/389, 370/57, 328, 386, 338, 255, 252, 349; 340/539.1, 340/539.11, 539.22, 564, 573.4, 539.13, 340/539.2, 539.21, 539.23

See application file for complete search history.

(56) References Cited

U.S. PATENT DOCUMENTS

| | | | | |
|---|---|---|---|---|
| 5,715,516 A * | 2/1998 | Howard et al. | ........... | 455/422.1 |
| 5,812,950 A * | 9/1998 | Tom | ........... | 455/440 |
| 6,104,712 A * | 8/2000 | Robert et al. | ........... | 370/389 |
| 6,246,882 B1 * | 6/2001 | Lachance | ........... | 455/456.4 |
| 6,271,757 B1 * | 8/2001 | Touchton et al. | ........... | 340/573.1 |
| 6,999,757 B2 * | 2/2006 | Bates et al. | ........... | 455/417 |
| 7,024,195 B2 * | 4/2006 | Miriyala et al. | ........... | 455/443 |
| 2001/0018349 A1 * | 8/2001 | Kinnunen et al. | ........... | 455/456 |
| 2002/0006788 A1 * | 1/2002 | Knutsson et al. | ........... | 455/422 |
| 2002/0086680 A1 * | 7/2002 | Hunzinger | ........... | 455/456 |
| 2002/0155844 A1 * | 10/2002 | Rankin et al. | ........... | 455/456 |
| 2002/0164997 A1 * | 11/2002 | Parry | ........... | 455/456 |
| 2002/0180618 A1 * | 12/2002 | Beri et al. | ........... | 340/988 |
| 2003/0236095 A1 * | 12/2003 | Ross | ........... | 455/456.1 |

* cited by examiner

*Primary Examiner*—George Eng
*Assistant Examiner*—Nam Huynh

(57) ABSTRACT

A smart area is defined in an area having a plurality of nodes. One or more electronic services are operable to be provided in the smart area. Location information for a border of a smart area being defined may be determined using a mobile node or determined using the plurality of nodes. The border for the smart area is defined based on the location information.

20 Claims, 23 Drawing Sheets

DEFINING A SMART AREA

FIELD OF THE INVENTION

The invention relates to a smart area where electronic services can be provided. More particularly, the invention relates to defining a border for the smart area.

BACKGROUND OF THE INVENTION

In today's high-technology era, users have access to a large variety of devices, including portable devices, that allow them to access a large amount of information from almost anywhere. However, typically the information provided to the user is not tailored to the specific user and the location of the user. For example, currently there is no efficient technique for providing dynamic advertising within a given area, such that advertising at a location of a user may be personalized for products or services that the user is interested in. Also, currently, there is no efficient technique for conditioning a user's access to particular products or services in a given area based on recognition of the user.

SUMMARY OF THE INVENTION

According to an embodiment of the invention, a method for defining a smart area in an area having a plurality of nodes comprises selecting at least some of the plurality of nodes, wherein the selected nodes are at corners of a smart area being defined. The method further comprises defining a border for the smart area based on location information for the selected nodes.

According to another embodiment of the invention, a method for defining a smart area in an area having a plurality of nodes comprises determining location information for a border of a smart area being defined using a mobile node; and defining the border for the smart area based on the location information.

According to yet another embodiment of the invention, a system for determining a smart area comprises a plurality of static nodes, at least one mobile node, and a smart area manager connected to the plurality of nodes and the at least one mobile node via a network. The smart area manager is operable to determine a border for the smart area based on location information received from one or more of the plurality of static nodes and the mobile node.

According to yet another embodiment of the invention, a method for performing an action associated with a smart area comprises receiving location information for a user; determining at least one smart area associated with the location information; identifying at least one policy associated with the at least one smart area; and performing an action based on the at least one policy.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

Figure 1:
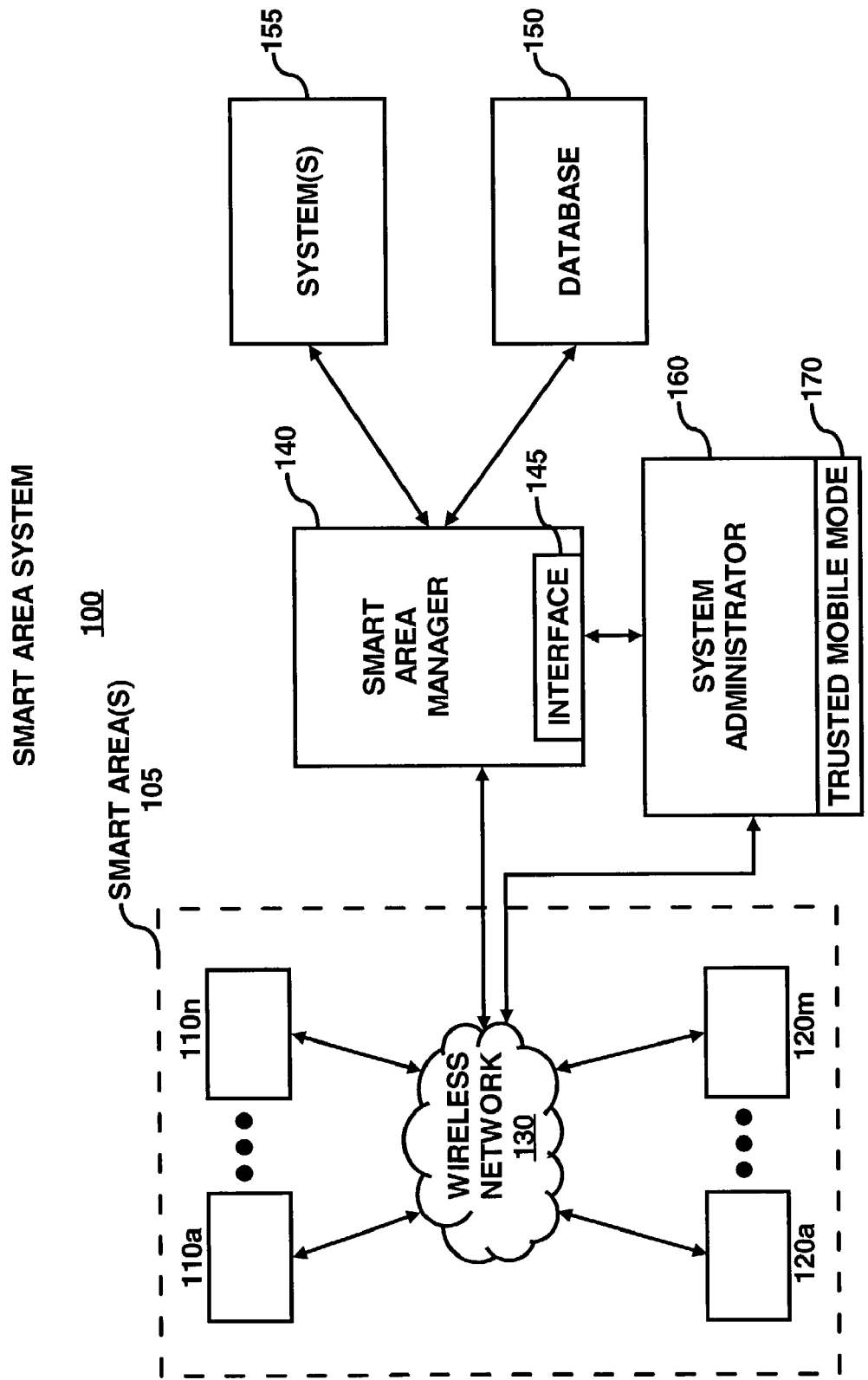
FIG. 1 illustrates a block diagram of a system, according to an embodiment of the invention.

FIG. 1 illustrates a smart area system 100 according to an embodiment of the invention. Static nodes 110a . . . n and mobile nodes 120a . . . n define one or more smart areas 105. The smart areas 105 may overlap. The smart areas 105 are areas where electronic services that can be personalized and localized are provided. The electronic services may be provided to users using mobile nodes 120a . . . m. The static nodes 110a . . . n and the mobile nodes 120a . . . m may be connected via a wireless network 130.

Also connected to the wireless network 130 is a smart area manager 140, a database 150, and one or more other systems 155. Alternatively, the smart area manager 140 may be connected to the wireless network 130 via another network, such as a local area network and/or wide area network (e.g., the Internet). The database 150 may provide information in response to a user request from, for example, the mobile node 120a in one of the smart areas 105. It will be apparent to one of ordinary skill in the art that the database 150 or any other data source (e.g., web page, etc.) may be operable to provide information in response to a user request in the system 100. Also, information regarding a user in one of the smart areas 105 may be provided to one or more external systems 155 that utilize the information. An external system 155, for example, may include an advertising system that provides localized advertising to the relevant smart area. The advertising can be personalized, such as advertisements for products or services that the user is interested in. Alternatively, an external system 155 may provide information regarding products or services in a smart area. These and other external systems may be used in the system 100.

The static nodes 110a . . . n provide location information for defining the borders of the smart areas 105. In one embodiment, the static nodes 110a . . . n may be computer-based nodes executing location software for defining borders for the smart areas 105. The static nodes 110a . . . n may communicate with each other to generate a coordinate system, such as X and Y borders that may be used to create the smart areas 105 therein. The coordinate system may have greater than two dimensions (e.g., latitude, longitude, and altitude). When a mobile node (e.g., one of the mobile nodes 120a . . . m or trusted mobile node 170) enters the coordinate system, the mobile node communicates with one or more of the static nodes 110a . . . n to get its location (i.e., location information) within the coordinate system. This location information may be transmitted to the smart area manager 140 to create a smart area or to invoke smart area services. In other embodiments, location information for a user may be determined using known algorithms executed by the static nodes 110a . . . n. Each static node may be placed at a location for an extended period of time.

The mobile nodes 120a . . . m and the trusted mobile node 170 may include conventional portable wireless devices (e.g., cellular phones, personal digital assistants, laptops, etc.). The mobile nodes 120a . . . m are operable to transmit information (e.g., location information of the mobile node), information related to the user of the mobile node, and/or a request for information related to one of the smart areas 105 being occupied by the user.

The smart area manager 140 may include one or more servers or the like operable to be connected to the wireless network 130, the database 150, the system(s) 155. The smart area manager 140 also includes an interface 145 for a system administrator 160. In one embodiment, the interface 145 may include an interface that allows the system administrator to select nodes for defining a smart area. The system administrator 160 may use the trusted mobile node 170 to define a smart area, such as described in detail below. The trusted mobile node 170 is a mobile node known by the smart area manager 140 to be used for defining smart areas. For example, a secured connection may be established between the trusted mobile node 170 and the smart area manager 140. The system administrator 160 may use the trusted mobile node 170 to provide location information for defining borders for a smart area.

Figure 2A:
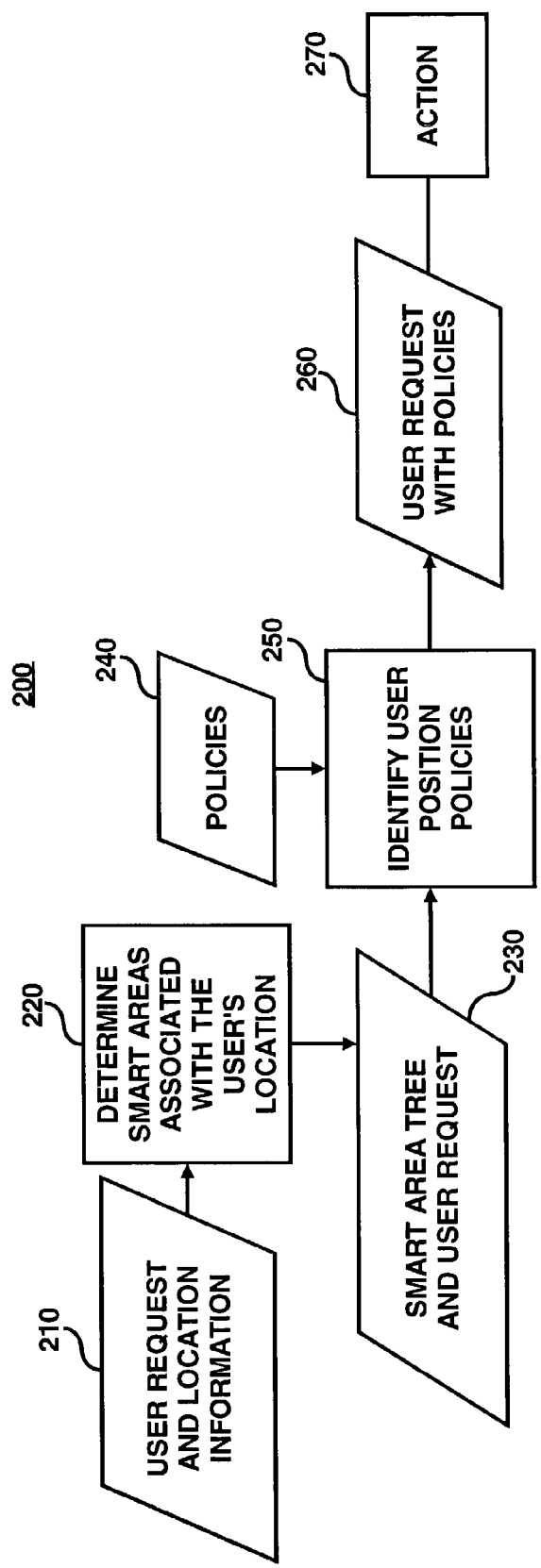
FIG. 2A illustrates a data flow diagram for the flow of data in the system shown in FIG. 1, according to an embodiment of the invention.

FIG. 2A illustrates a data flow diagram 200 for the flow of data in the smart area system 100, according to an embodiment of the invention. FIG. 2A is described with respect to an example, such as a user inquiring about products in one more of the smart areas 105, for purposes of providing a clear understanding of the system 100. It will be apparent to one of ordinary skill in the art that the system 100 may be used to request information about anything related to a smart area within the system 100. Furthermore, information transmitted from a mobile device may not include a request and may simply include information about the user, such as for use with the systems 155.

A user using the mobile node 120a scans a barcode of a wine bottle in one or more of the smart areas 105. For example, the user may be in overlapping smart areas or a single smart area. User information and location information of the mobile node 120a (e.g., determined by one or more of the static nodes 120a . . . n) is transmitted to the smart area manager 140. The user information includes, for example, a request 210 for information about the wine bottle. The user information may also include information about the user which can be used by an advertisement system (e.g., one of the systems 155) for generating advertisements within the smart space currently occupied by the user and targeted at products of interest to the user.

The smart area manager 140 determines the smart area(s) 105 that the user is occupying based on the location information (220). For example, the smart area manager 140 stores the borders of the smart areas 105 and identifies which of the smart areas 105, such as with overlapping smart areas, that the user is occupying based on the location information. If the user is in overlapping smart areas, a tree of the smart areas 230 may be used to identify policies associated with the overlapping smart areas.

Figure 2B:
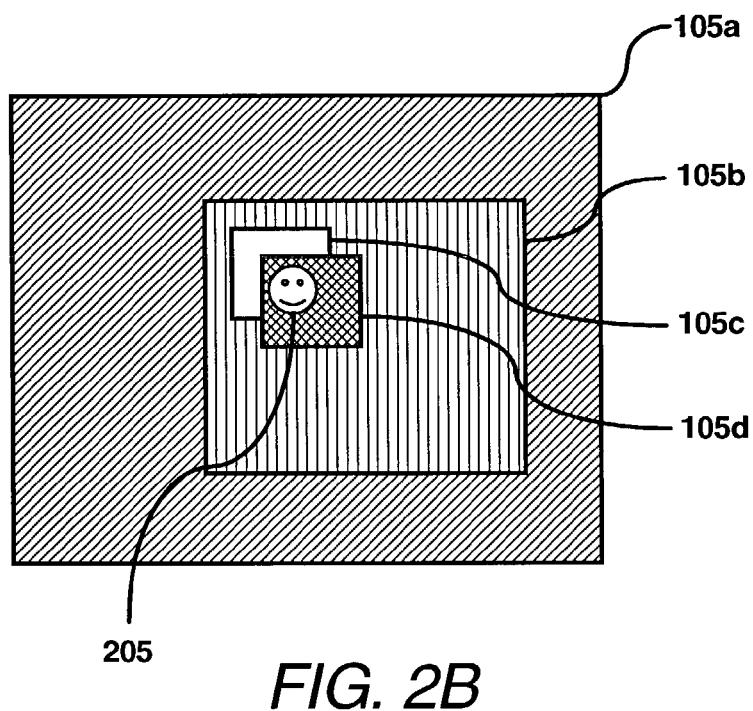
FIG. 2B illustrates overlapping smart areas, according to an embodiment of the invention.
Figure 2C:
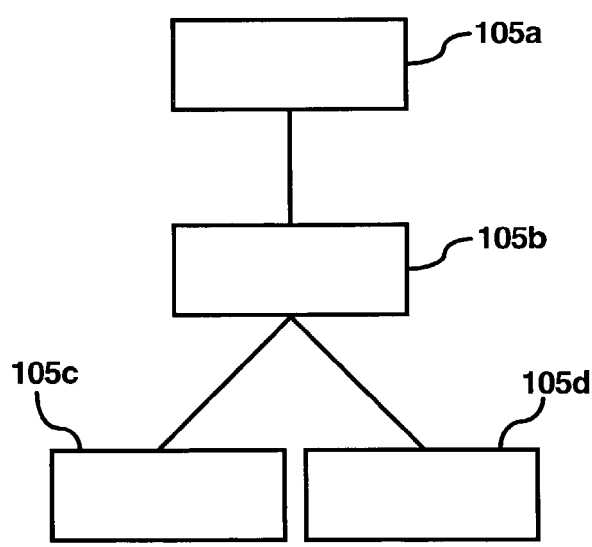
FIG. 2C illustrates a smart area tree, according to an embodiment of the invention.

FIG. 2B illustrates a user 205 (e.g., a user making the request 210 of FIG. 2A) in overlapping smart areas 105a . . . d. The smart area 105a is the largest and completely encompasses the smart areas 105b . . . d. The smart area 105b completely encompasses the smart areas 105c and 105d. The smart areas 105c and 105d have some overlap with each other. FIG. 2C illustrates a tree 215, which is exemplary representation of the overlap of the smart areas 105a . . . d that the user 205 is occupying.

In the data flow diagram of FIG. 2A, the smart area manager 140 identifies one or more policies 250 for the tree of smart areas 230 and adds the policies 250 to the request. For example, the smart area manager 140 selects one or more of the policies 240 associated with the smart areas the user is occupying. In one embodiment, the policies 240 may be stored in a database (not shown) connected to the smart area manager 140, and the smart area manager 140 retrieves relevant policies from the database.

A policy of the policies 240 may include a condition associated with a smart area. For example, the condition may be associated with one or more particular users or one or more available services/applications associated with the smart area. For example, the user requesting information about the wine bottle may be a preferred customer having access to print services that can be used to print pricing information. Thus, one of the identified policies 250 may include access to print services in the occupied smart area. Another example may include a security policy, where a particular user has security clearance within particular smart areas.

As described with respect to FIGS. 2B and 2C, a user may be occupying overlapping smart areas. Overlap policy information may be included in the policies 240 and identified by the smart area manager 140. Overlap policy information may identify which policy has precedence when policies for overlapping smart areas conflict. For example, referring to FIG. 2B, the smart area 105c may have a policy giving the user 160 security clearance within the smart area 105c. The user may not have security clearance in the smart area 105d based on a policy associated with the smart area 105d. Overlap policy information for the smart area 105d may include not giving security clearance for any area overlapping smart area 105d.

In FIG. 2A, the user request and identified polices 260 are used to perform an action 270, which may include providing requested information, providing an action on the environment, etc. For example, the action 270 may include retrieving information pertaining to the request (e.g., wine bottle price) from a data source (e.g., the database 150) and transmitting the information to the user. The action 270 may also include providing one or more services through the systems 155.

Figure 3A:
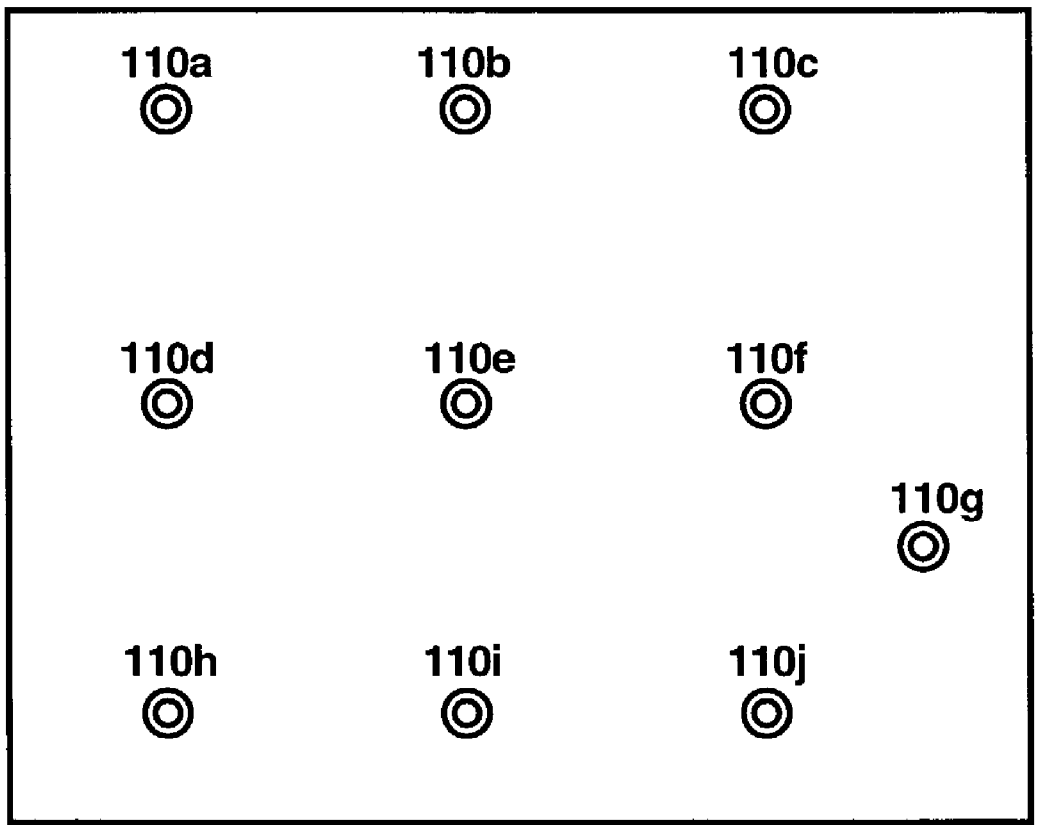
FIGS. 3A-D illustrate creating a smart area, according to an embodiment of the invention.

As described above, one or more smart areas 105 may be defined using the static nodes 120a . . . n in the system 100. FIGS. 3A-D illustrate defining smart areas according to an embodiment of the invention. In FIG. 3A, a plurality of static nodes 110a . . . j are placed for defining smart areas. The static nodes 110a . . . j may be placed at corners of smart areas being defined, or the static node 10a . . . j may be generally placed, such that the system administrator can select groups of the static nodes 110a . . . j for defining a smart area The static nodes 110a . . . j may communicate with each other to determine a coordinate system and provide location information within the coordinate system for each of the static nodes 110a . . . j to the smart area manager 140.

Figure 3B:
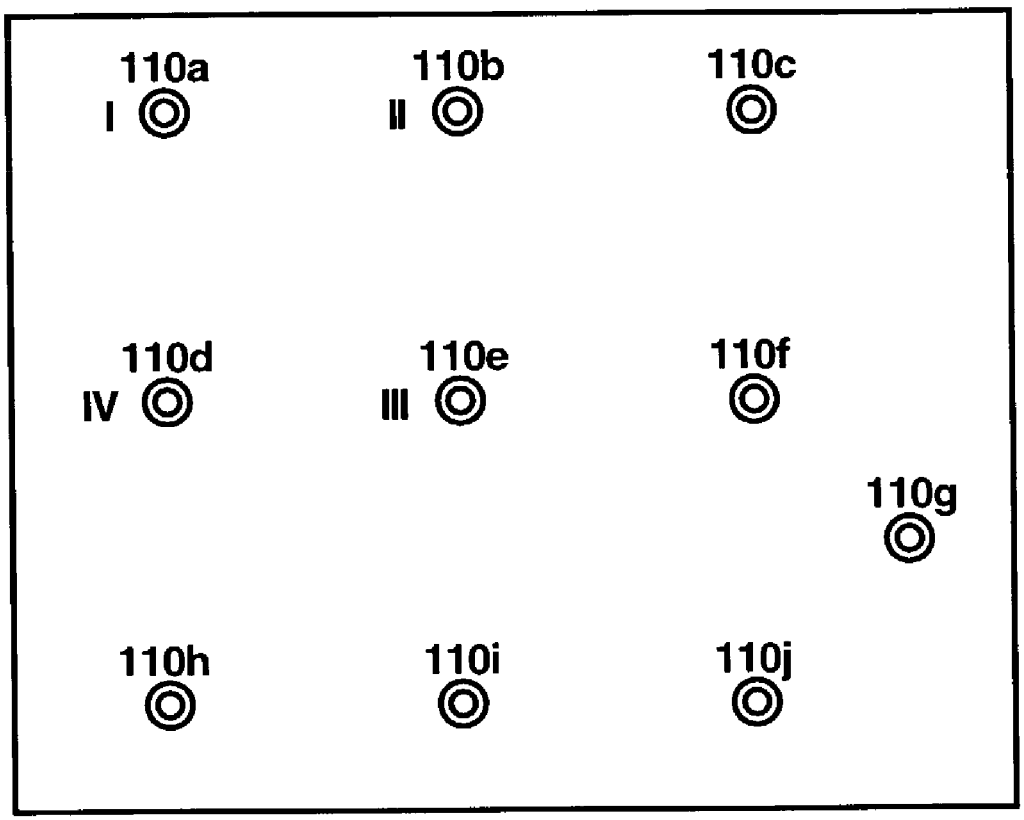

In FIG. 3B, the system administrator 160 of FIG. 1 selects static nodes for defining a smart area. For example, as shown in FIG. 1, the smart area manager 140 includes the user interface 145. The user interface 145 may include an interface allowing the administrator 160 to select static nodes for defining a smart area. Static nodes 110a, 110b, 110e, and 110d may be selected, for example, by the administrator 160 for defining a smart area 105a, shown in FIG. 3C. In one embodiment, the static nodes are selected in a particular order. For example, the first static node selected (e.g., the static node 110a) is a beginning point of a geometric figure approximately defining the border of the smart area being defined. The next static node selected (e.g., the static node 110b) is the next consecutive point on an outline or border of the geometric figure. Each point on the border may be a corner of the geometric figure approximately defining the border of the smart area being defined. The static nodes may be selected until the starting point (e.g., the static node 110a) is approximately reached. If the last static node selected is not approximately the starting point, then the smart area manager 140 may interpolate the remaining portion of the border.

Figure 3C:
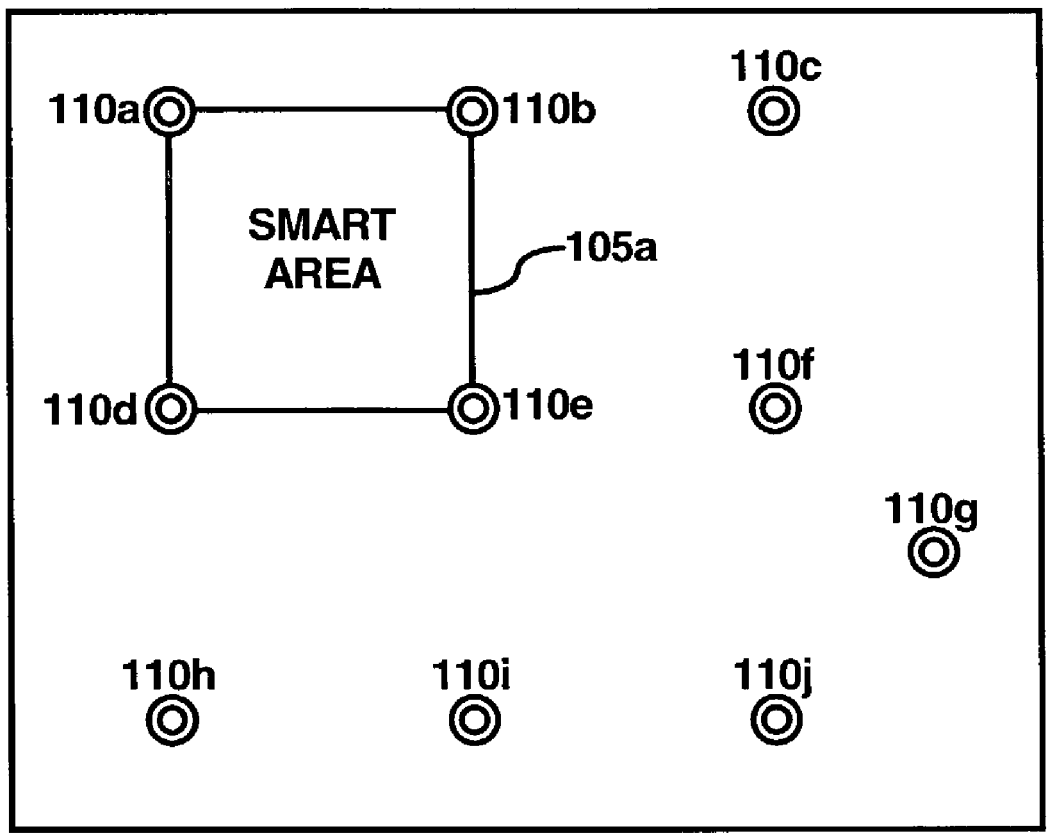
Figure 3D:
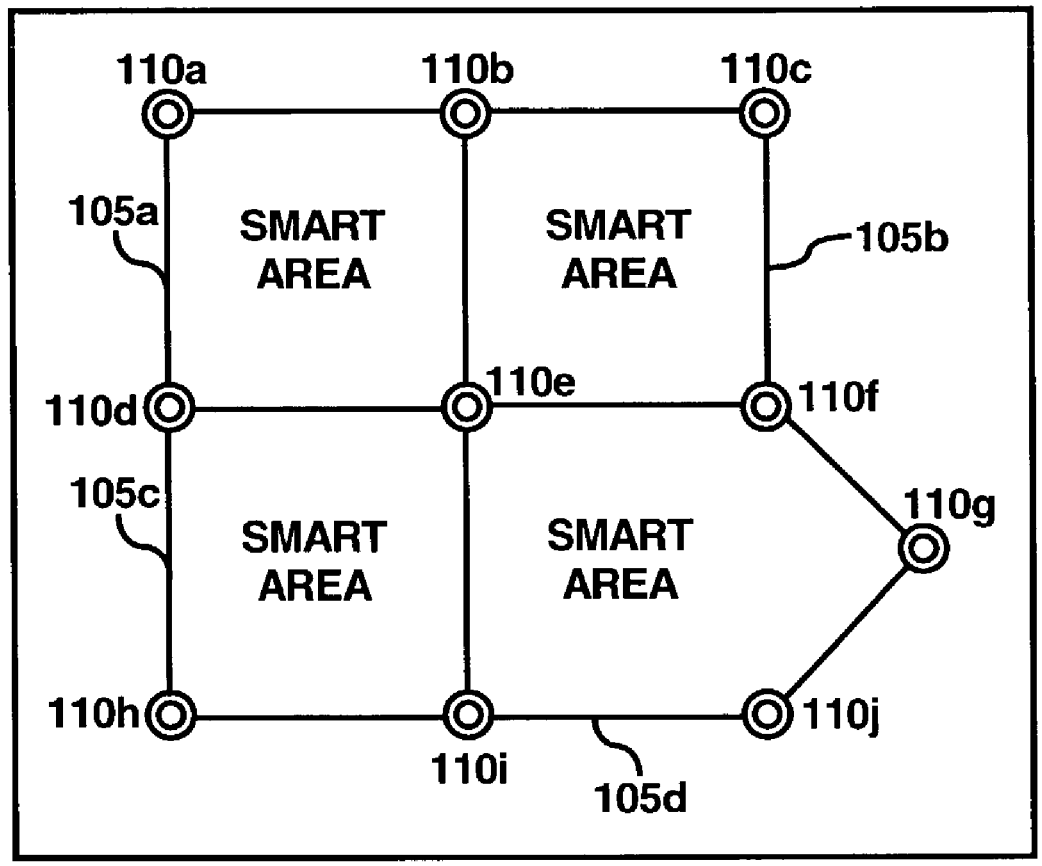

In FIG. 3C, the smart area manager 140 defines the smart area 105a based on the selected static nodes. For example, the smart area manager 140 determines and stores the borders of the smart area 105a, such that the smart area manager 140 can determine when a mobile node enters the smart area 105a. Border information may include the location information of the static nodes 110a, 110b, 110d, and 110e and location information for a border of a corresponding geometric figure. FIG. 3D illustrates multiple smart areas 105a . . . d defined using the static nodes 110a . . . j shown in FIG. 3A.

Figure 4:
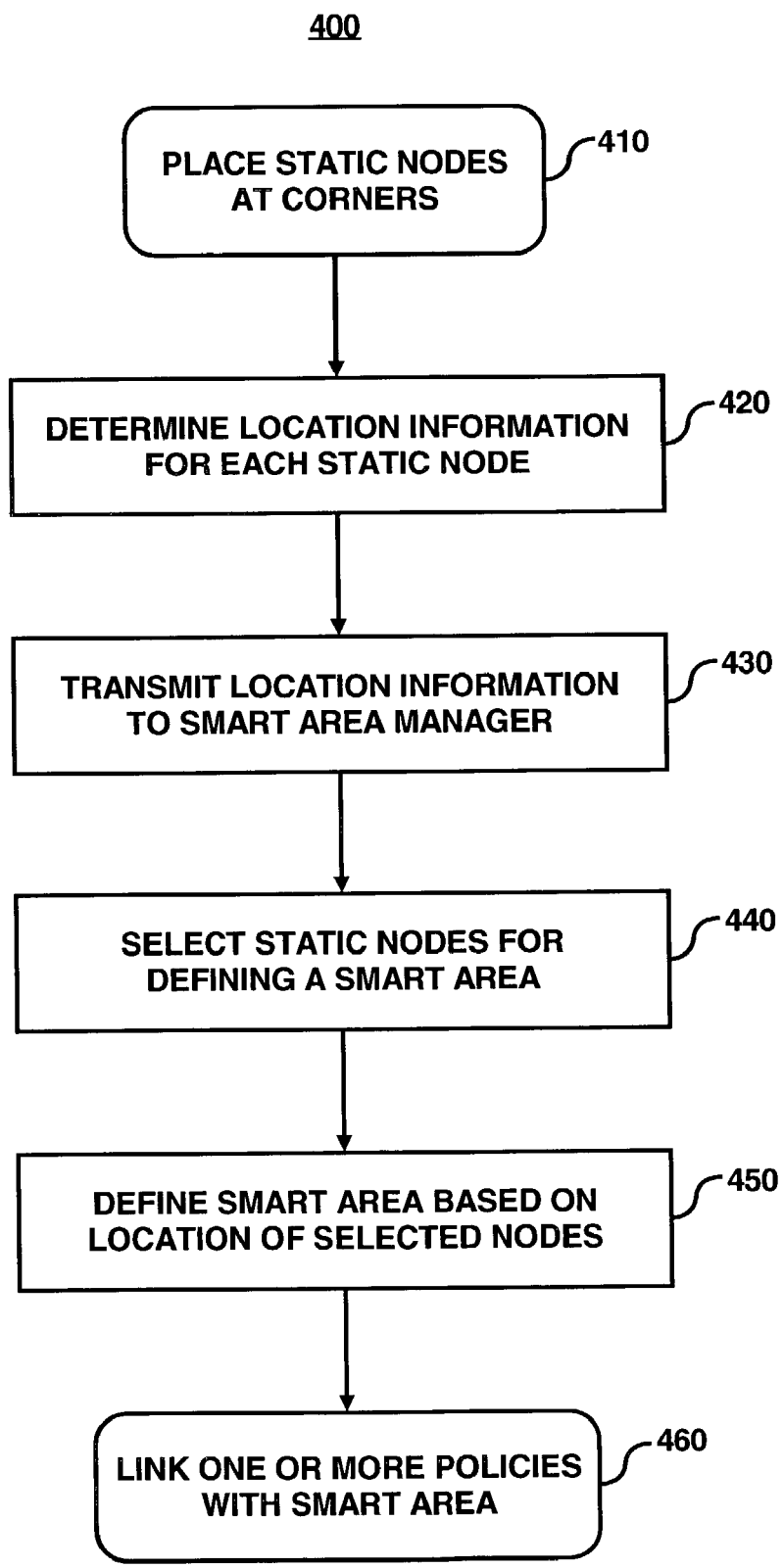
FIG. 4 illustrates a flow diagram of a method for creating a smart area, according to the embodiment shown in FIGS. 3A-D.

FIG. 4 illustrates a method 400 for defining a smart area, according to the embodiment of the invention shown in FIGS. 3A-D. In step 410, static nodes (e.g., the static nodes 110a . . . j) are placed. The static nodes may be placed at the corners of smart areas being defined or generally placed. In step 420, location information is determined for each static node. In step 430, the location information is transmitted to the smart area manager 140. In step 440, static nodes (e.g., the static nodes 110a, 110b, 110d, and 110e) are selected for defining a smart area. In step 450, the smart area (e.g., the smart area 105a) is defined based on the location of the selected static nodes. For example, a border of the smart area is determined based on the location information, such that electronic services may be provided to a user crossing the border and entering the smart area. In step 460, one or more policies are linked to the defined smart area. Some or all of the steps in the method 400 may be repeated for defining multiple smart areas. For example, steps 420-460 may be repeated for each smart area being defined.

Figure 5A:
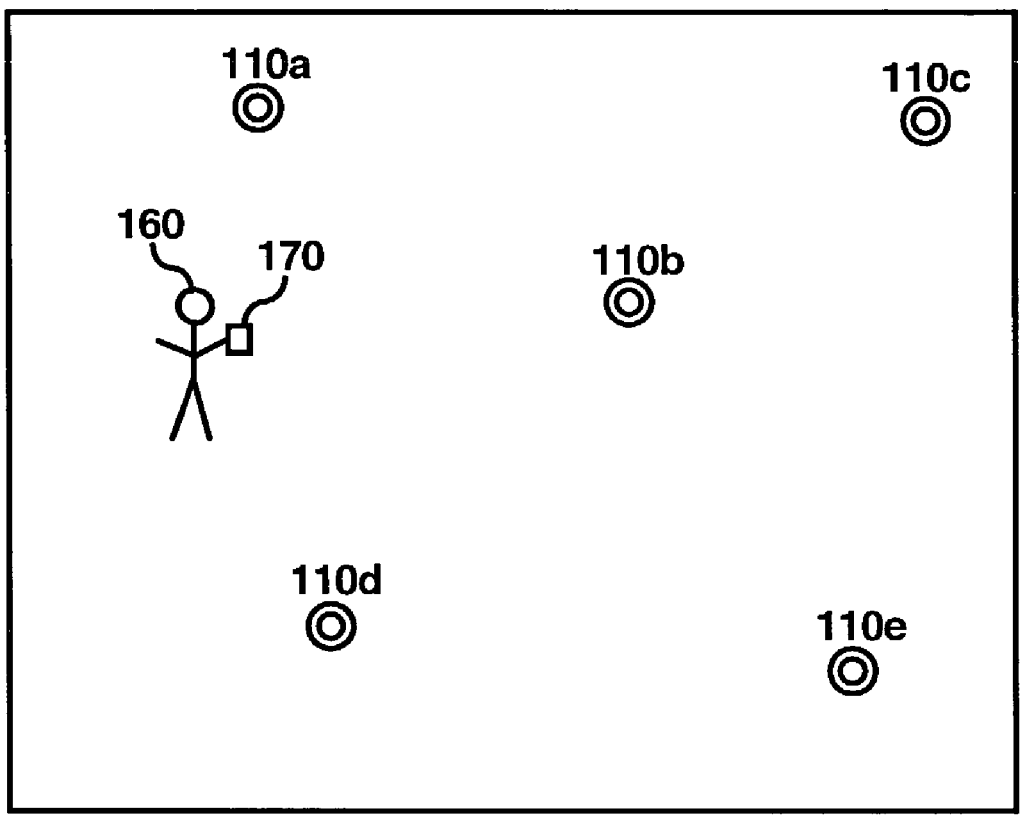
FIGS. 5A-D illustrate creating a smart area, according to another embodiment of the invention.

FIGS. 5A-D illustrate defining a smart area according to another embodiment of the invention. FIG. 5A illustrates static nodes 110a . . . e placed, for example, by the administrator 160 of FIG. 1. The static nodes 110a . . . j may communicate with each other to determine a coordinate system and provide location information within the coordinate system for each of the static nodes 110a . . . e to the smart area manager 140. The administrator 160 uses the trusted mobile node 170 to communicate with the smart area manager 140.

Figure 5B:
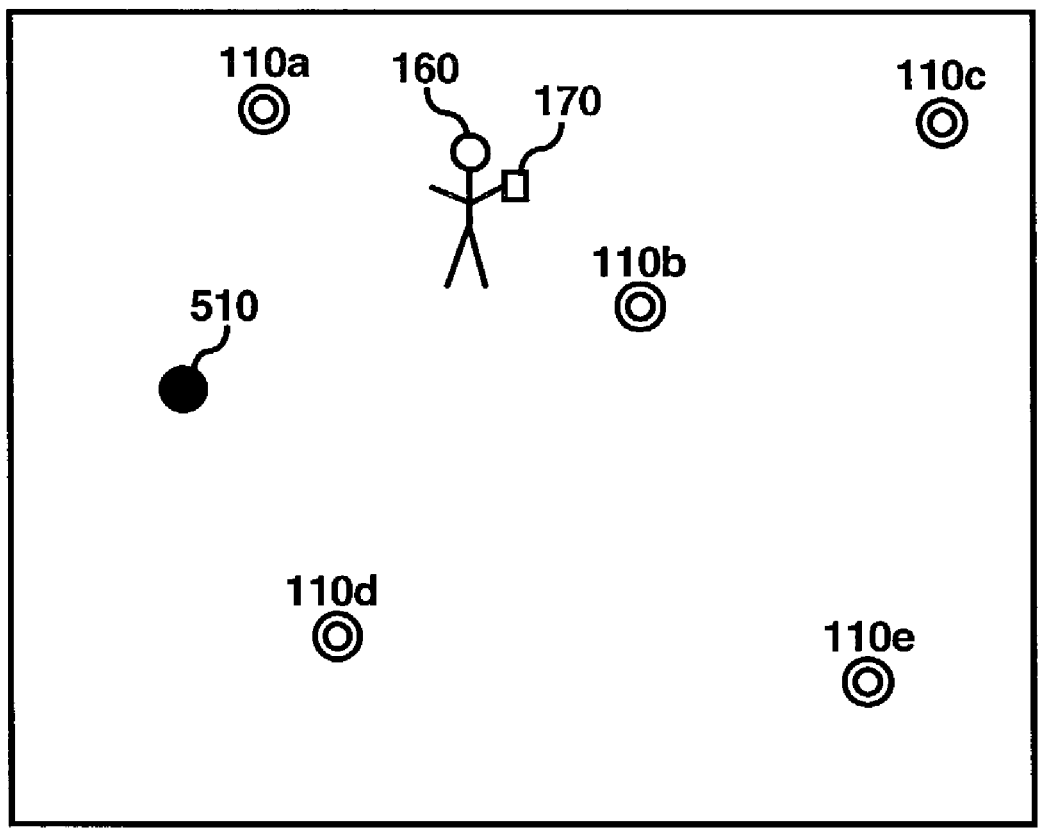
Figure 5C:
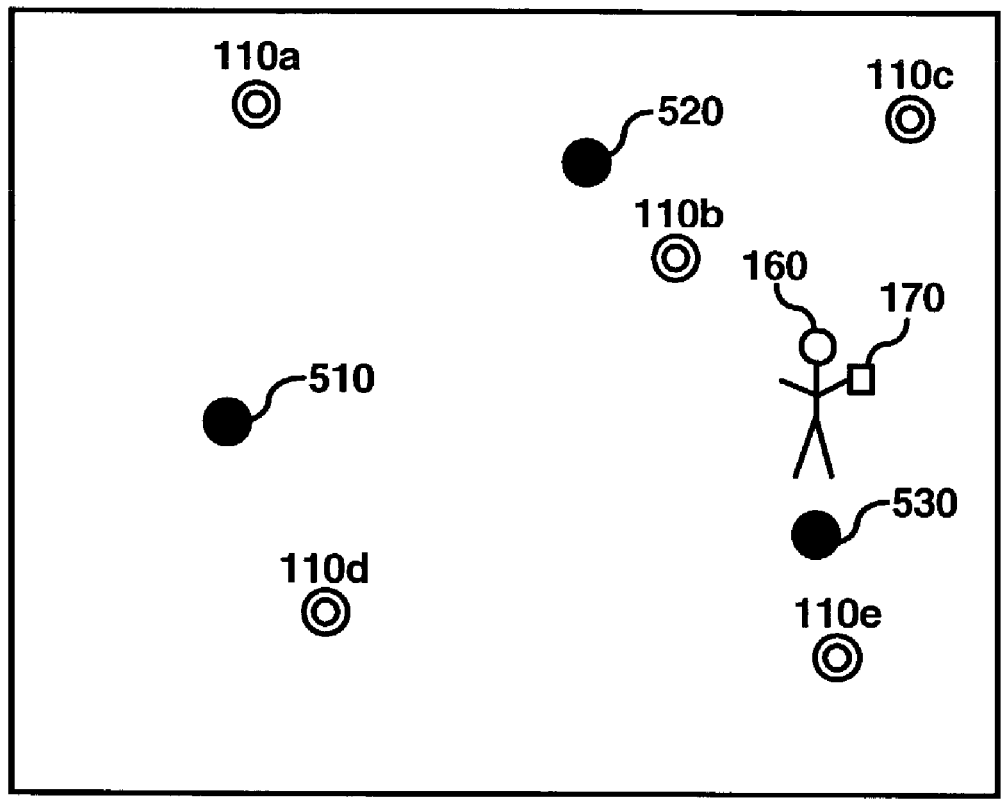
Figure 5D:
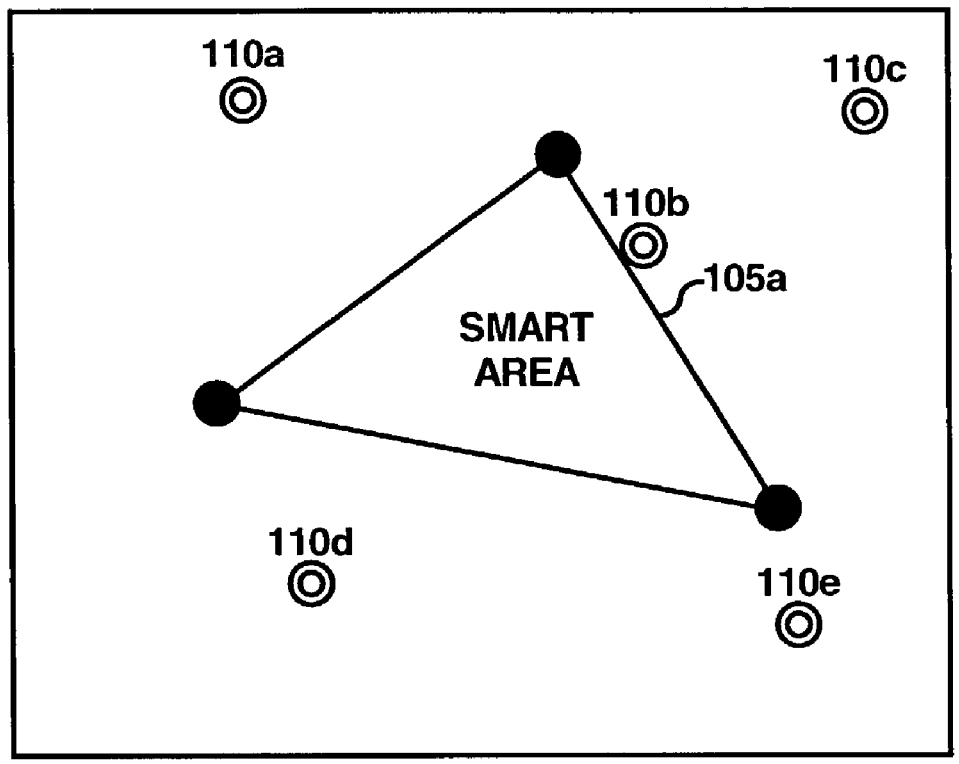

As shown in FIG. 5B, the administrator 160 moves to a first corner 510 of a smart area being defined. At the first corner 510, the administrator 160 transmits location information to the smart area manager 140. Transmission of location information is repeated at each corner of the smart area being defined. FIG. 5C illustrates establishing location information for corners 520 and 530 of the smart area being defined. The administrator 160 sends a request to the smart area manager 140 to close the smart area being defined after sending location information for each corner 510-530. Then, the smart area manager 140 defines a smart area 105a, shown in FIG. 5D, based on the location information for each corner. The border of the smart area 105a may represent geometric figures other than a triangle.

Figure 6:
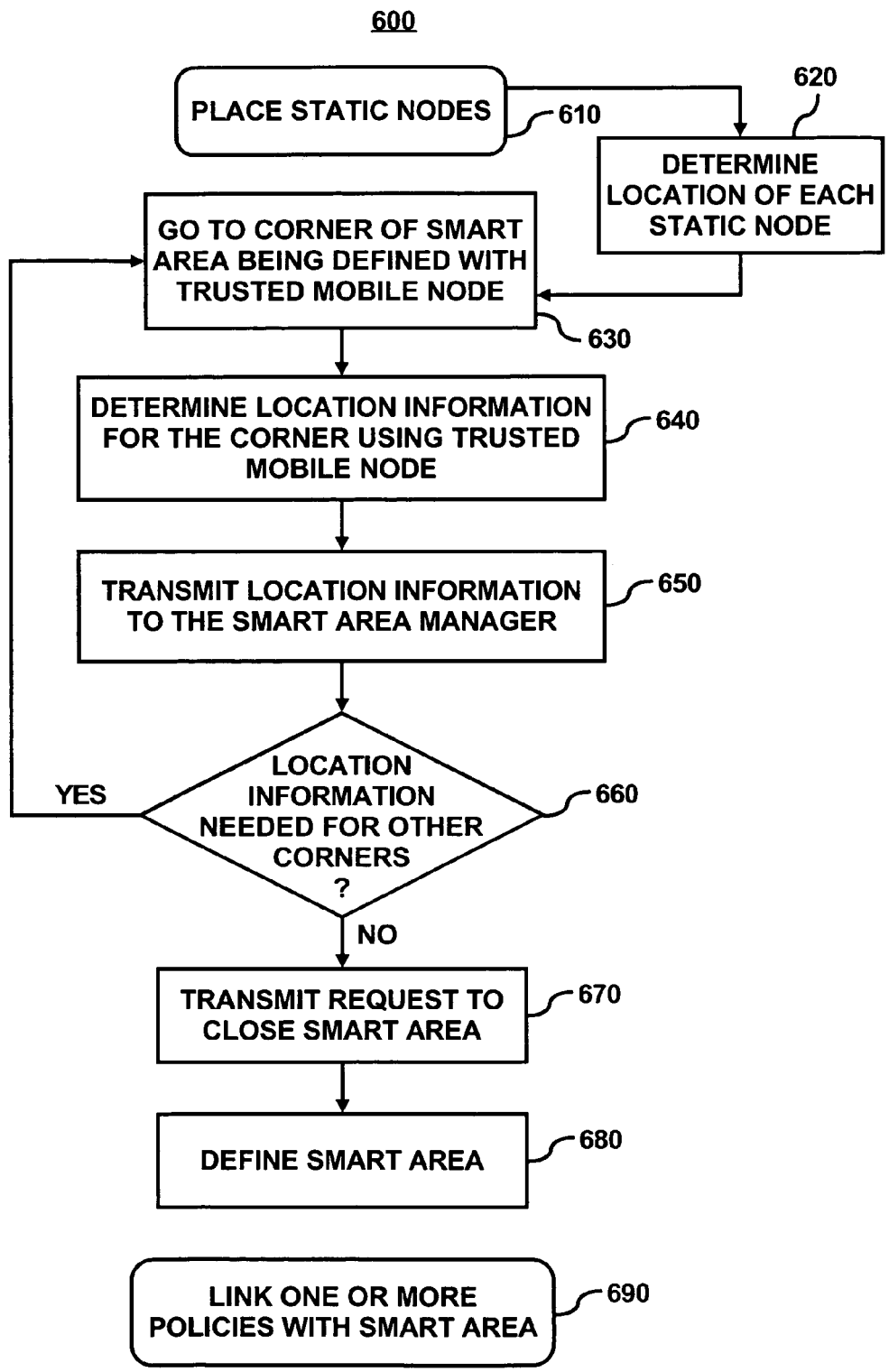
FIG. 6 illustrates a flow diagram of a method for creating a smart area, according to the embodiment shown in FIGS. 5A-D.

FIG. 6 illustrates a method 600 for defining a smart area, according to the embodiment of the invention shown in FIGS. 5A-D. In step 610, static nodes (e.g., the static nodes 110a . . . e) are placed. In step 620, location information is determined for each static node.

In step 630, the administrator 160 moves to a corner (e.g., the corner 510) of the smart area being defined with the trusted mobile node 170 of FIG. 1. In step 640, location information is determined for that corner. For example, the trusted mobile node 170 positioned at the corner obtains its location information from static nodes. In step 650, the location information is transmitted to the smart area manager 140.

In step 660, the administrator 160 determines whether location information is needed for anymore corners of the smart area being defined. If more location information is needed, steps 630-660 are repeated. If no more location information is needed, the administrator 160 sends a request to the smart area manger 140 to close the smart area being defined (step 670). In step 680, the smart area is defined by the smart area manager 140. For example, a border of the smart area is determined based on the location information, such that electronic services may be provided to a user crossing the border and entering the smart area. In step 690, one or more policies are linked to the defined smart area. Some or all of the steps in the method 600 may be repeated for defining multiple smart areas. For example, steps 630-690 may be repeated for each smart area being defined.

Figure 7A:
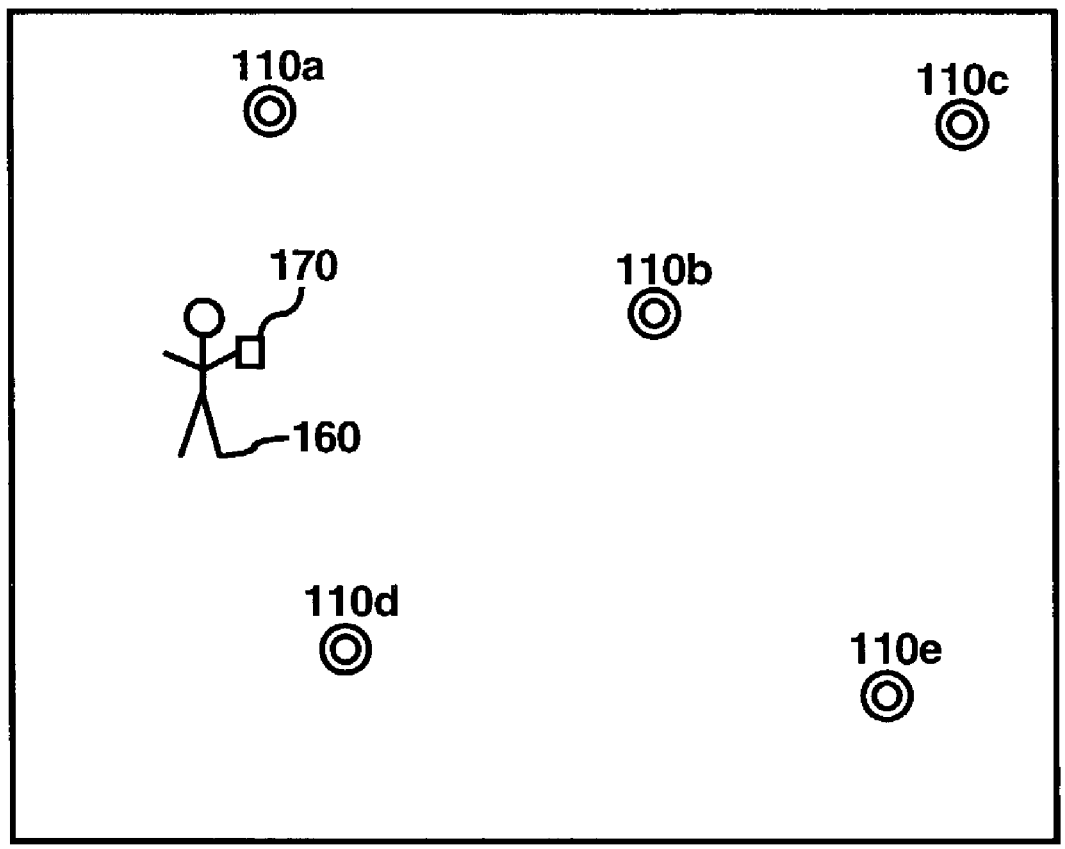
FIGS. 7A-D illustrate creating a smart area, according to yet another embodiment of the invention.

FIGS. 7A-D illustrate defining smart areas according to another embodiment of the invention. FIG. 7A illustrates static nodes 110a . . . e placed, for example, by the administrator 160. The static nodes 110a . . . e may communicate with each other to determine a coordinate system and provide location information within the coordinate system for each of the static nodes 110a . . . e to the smart area manager 140. The administrator 160 uses the trusted mobile node 170 to communicate with the smart area manager 140.

Figure 7B:
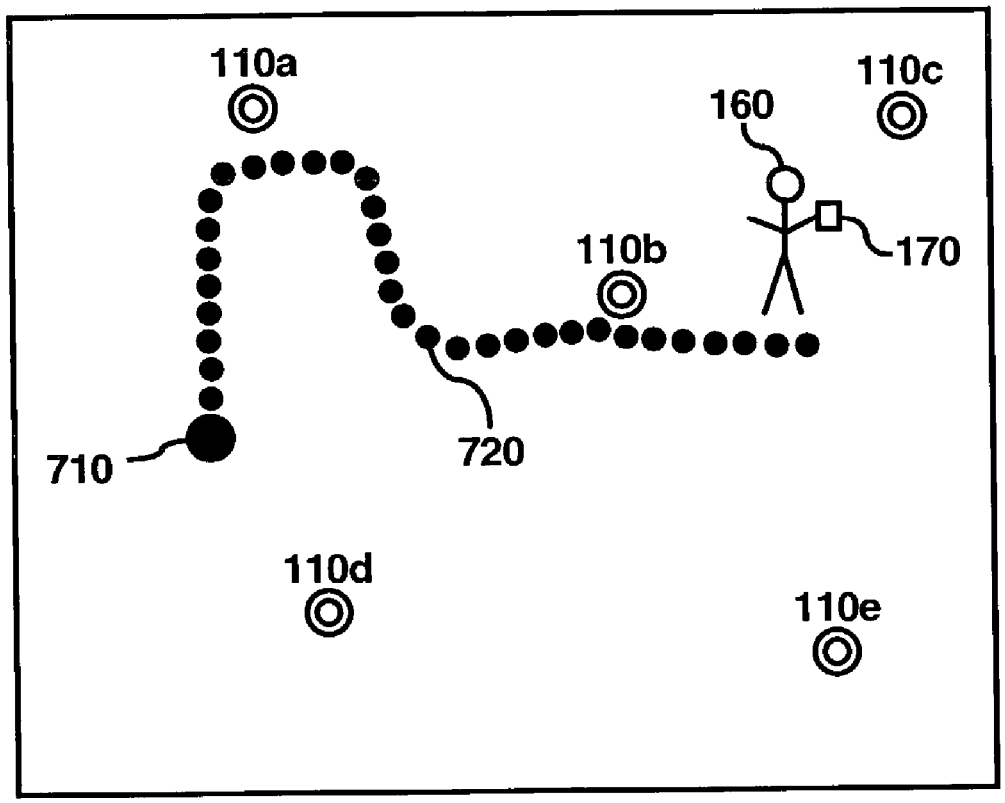
Figure 7C:
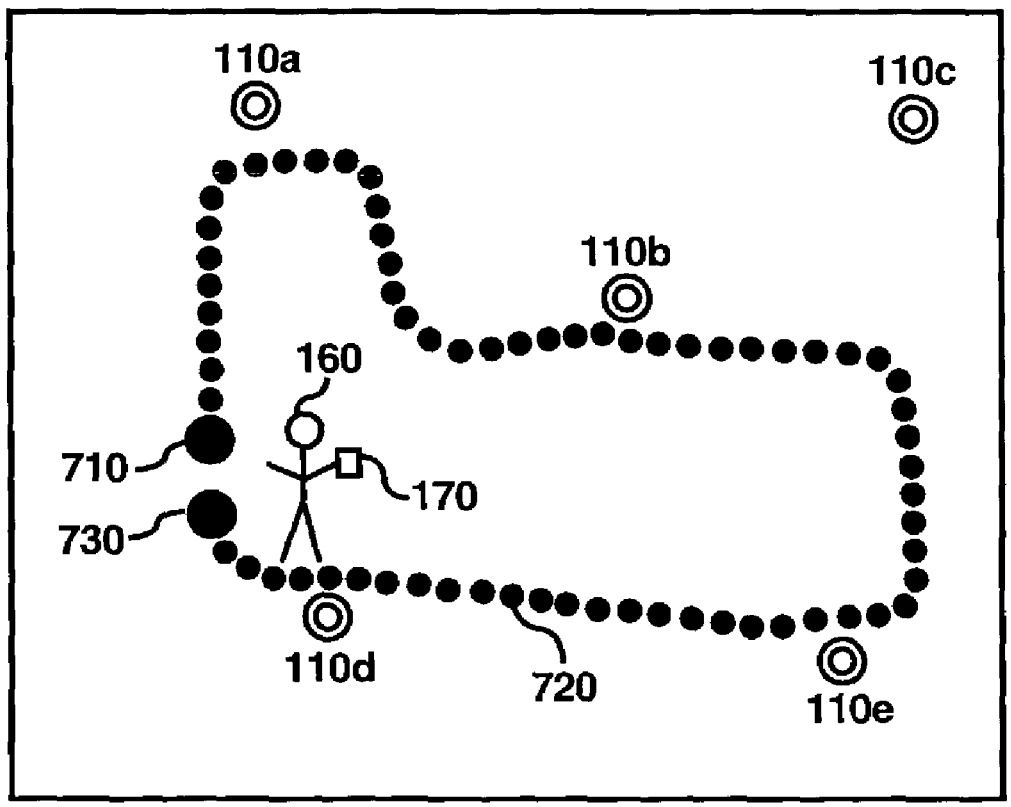
Figure 7D:
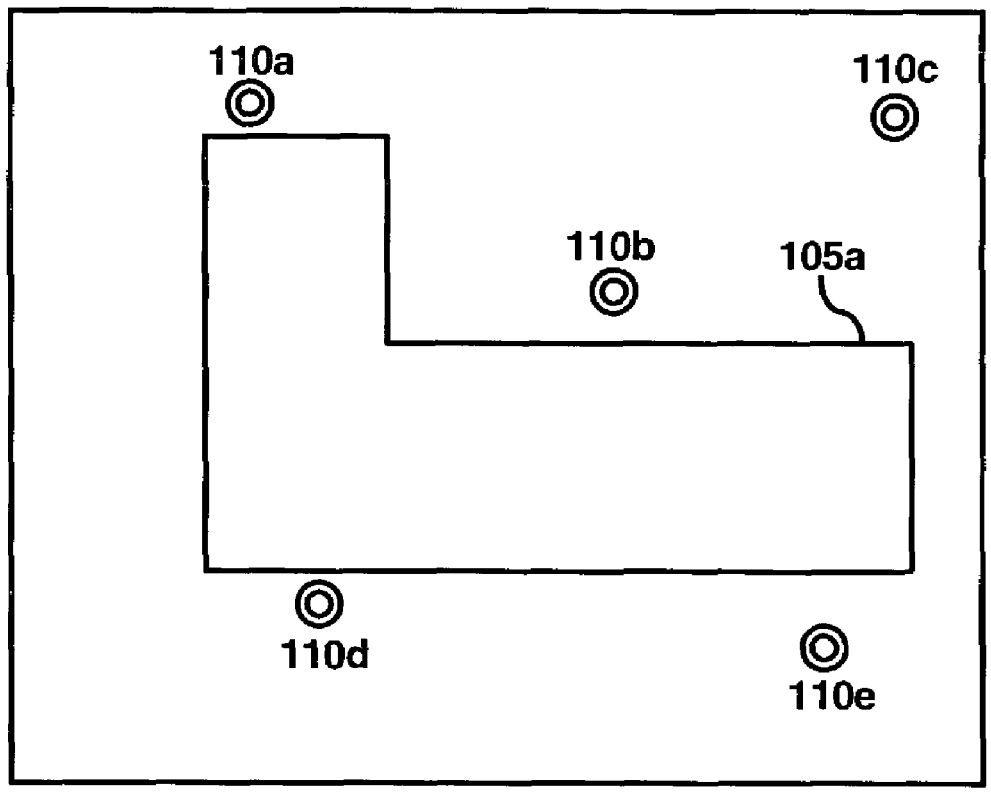

As shown in FIG. 7B, the administrator 160 moves to a location 710 on a border of the smart area being defined. At the location 710, the administrator 160 transmits location information to the smart area manager 140. As shown in FIG. 7B, the administrator 160 walks along a path 720 corresponding to the border of the smart area being defined. As the administrator walks along the path 720, the mobile node is periodically sending location information to the smart manager 140. As shown in FIG. 7C, the administrator 160 continues to transmit location information along the path 720 until a location 730 is reached. The location 730 may be the same or approximately the same as the location of the location 720. Alternatively, the location 730 may be distanced from the location 720. An interpolation process, such as computing a closest geometric figure, may be used to complete the path 720. The administrator 520 sends a request to the smart area manager 140 to close the smart area being defined after sending location information at the location 730. Then, the smart area manager 140 defines the smart area 105a, shown in FIG. 7D, by computing the closest geometric figure matching the path 720. Algorithms known in the art may be used for computing the closest geometric figure.

Figure 8:
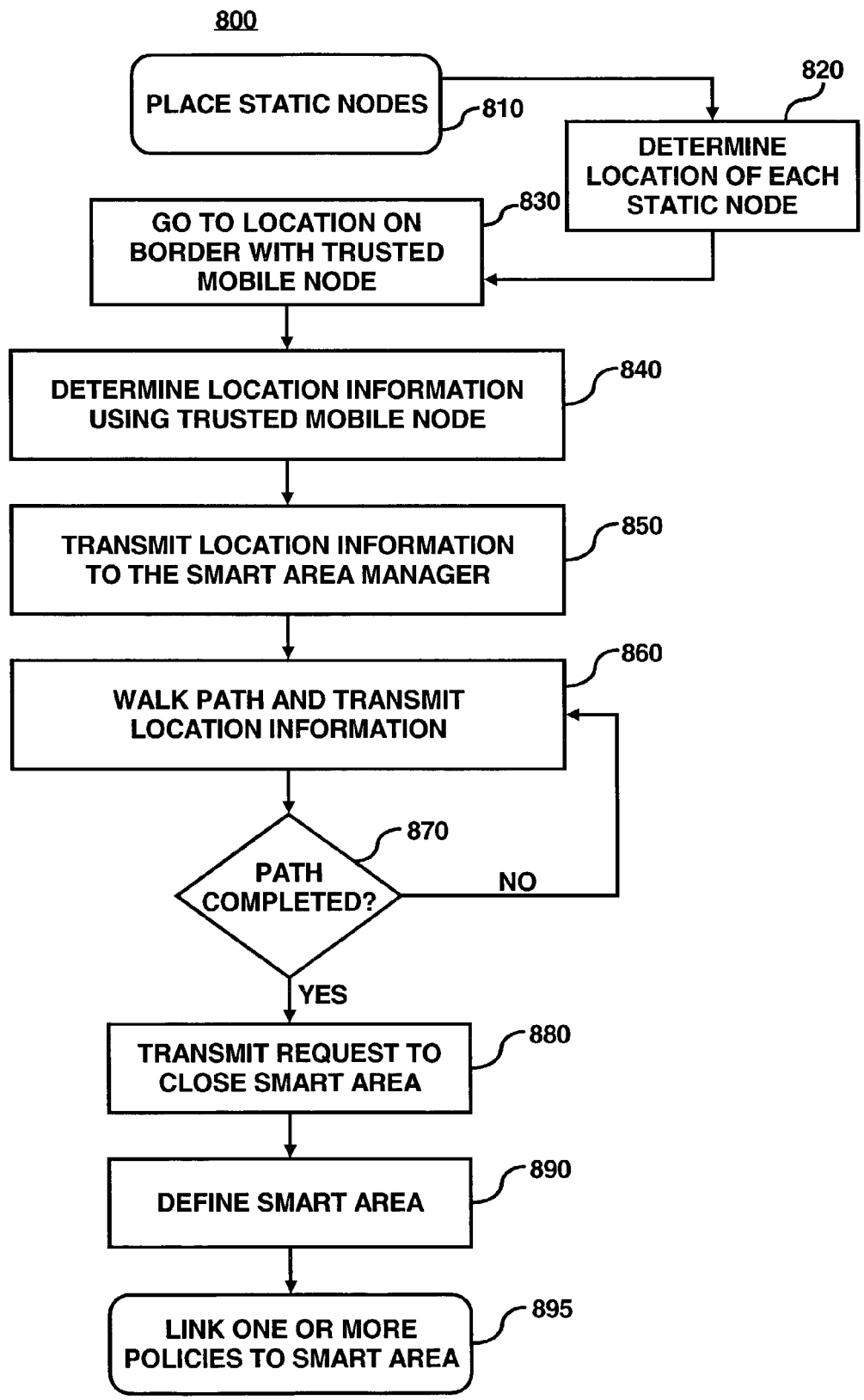
FIG. 8 illustrates a flow diagram of a method for creating a smart area, according to the embodiment shown in FIGS. 7A-D.

FIG. 8 illustrates a method 800 for defining smart areas, according to the embodiment of the invention shown in FIGS. 7A-D. In step 810, static nodes (e.g., the static nodes 110a . . . e) are placed. In step 820, location information is determined for each static node.

In step 830, the administrator 160 moves to a location on a border of the smart area being defined with the trusted mobile node 170 of FIG. 1. In step 840, location information is determined for that location on the border. For example, the trusted mobile node 170 positioned at the location on the border obtains its location information from static nodes. In step 850, the location information is transmitted to the smart area manager 140.

In step 860, the administrator 160 moves along a path corresponding to the border of the smart area being defined and simultaneously transmits location information for the border to the smart area manager 140. In step 870, the administrator 160 determines whether the path is completed. If the path is not complete, the administrator 160 keeps moving until the path is complete. If the path is completed, the administrator 160 sends a request to the smart area manger 140 to close the smart area being defined (step 880). In step 890, the smart area is defined by the smart area manager 140. For example, the smart area manager 140 defines the smart area by computing the closest geometric figure substantially resembling the path. For example, a border of the smart area is determined based on the geometric figure, such that electronic services may be provided to a user crossing the border and entering the smart area. In step 895, one or more policies are linked to the defined smart area. Some or all of the steps in the method 800 may be repeated for defining multiple smart areas. For example, steps 830-895 may be repeated for each smart area being defined.

Figure 9A:
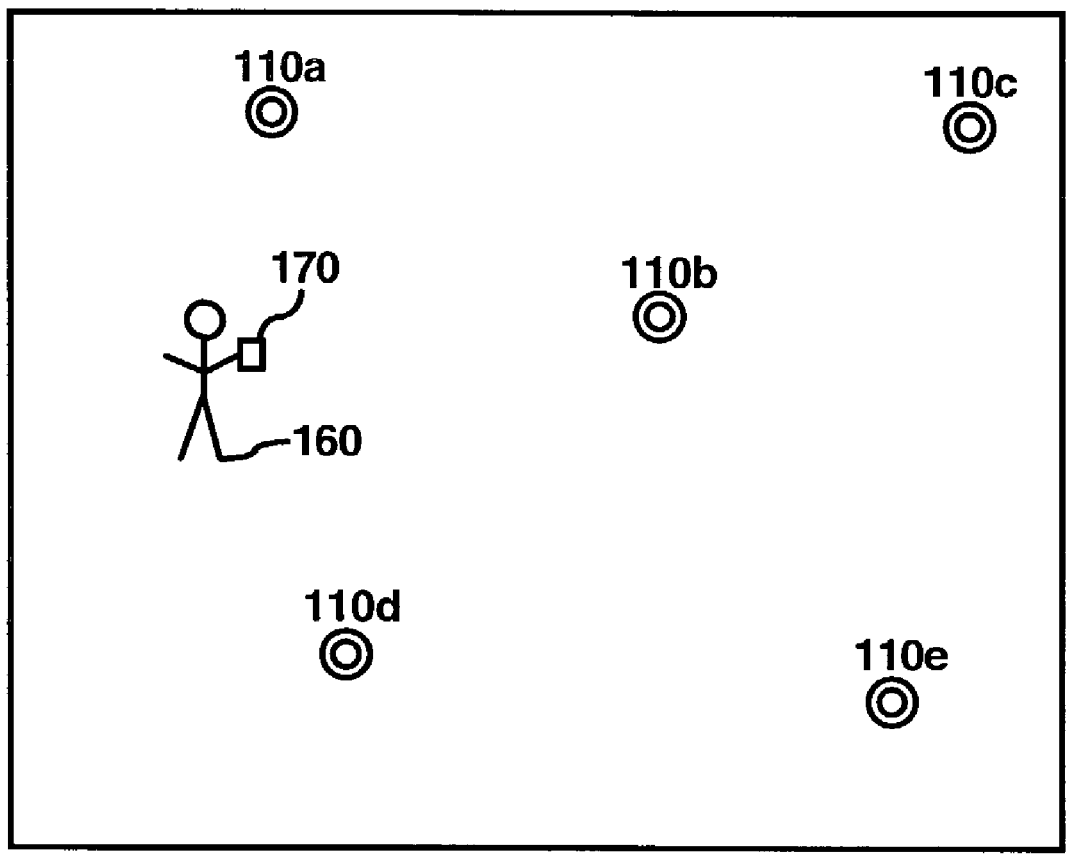
FIGS. 9A-D illustrate creating a smart area, according to yet another embodiment of the invention.

FIGS. 9A-D illustrate defining smart areas according to another embodiment of the invention. FIG. 9A illustrates static nodes 110a . . . e placed, for example, by the administrator 160. The static nodes 110a . . . e may communicate with each other to determine a coordinate system and provide location information within the coordinate system for each of the static nodes 110a . . . e to the smart area manager 140. The administrator 160 uses the trusted mobile node 170 to communicate with the smart area manager 140.

Figure 9B:
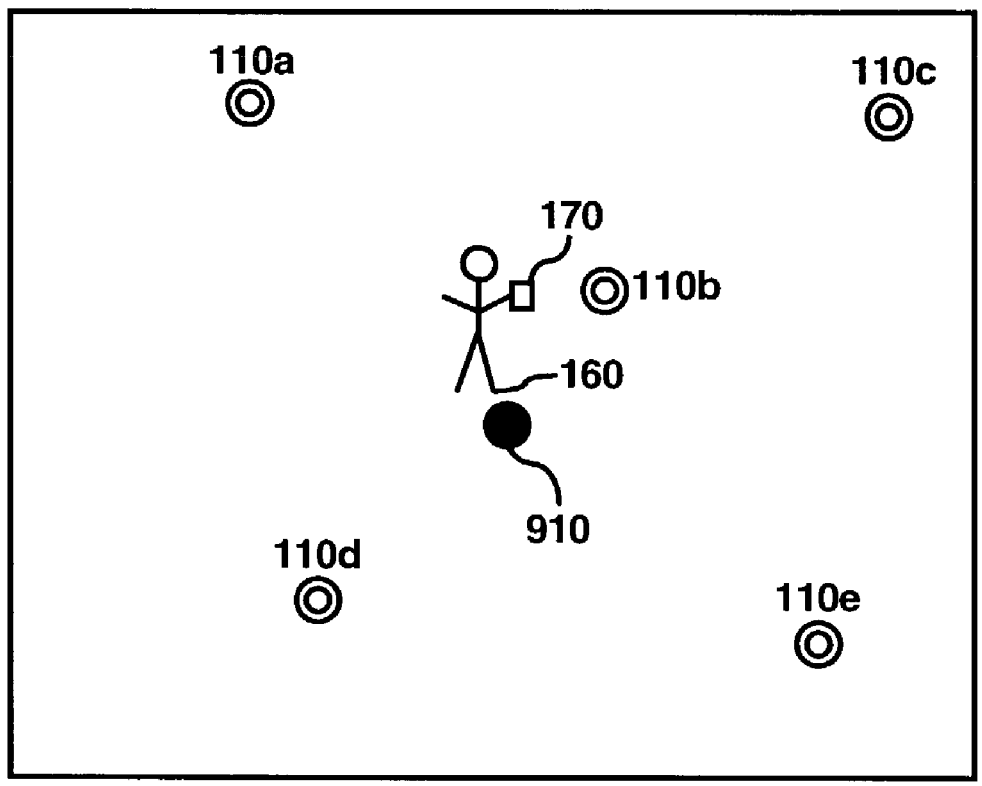
Figure 9C:
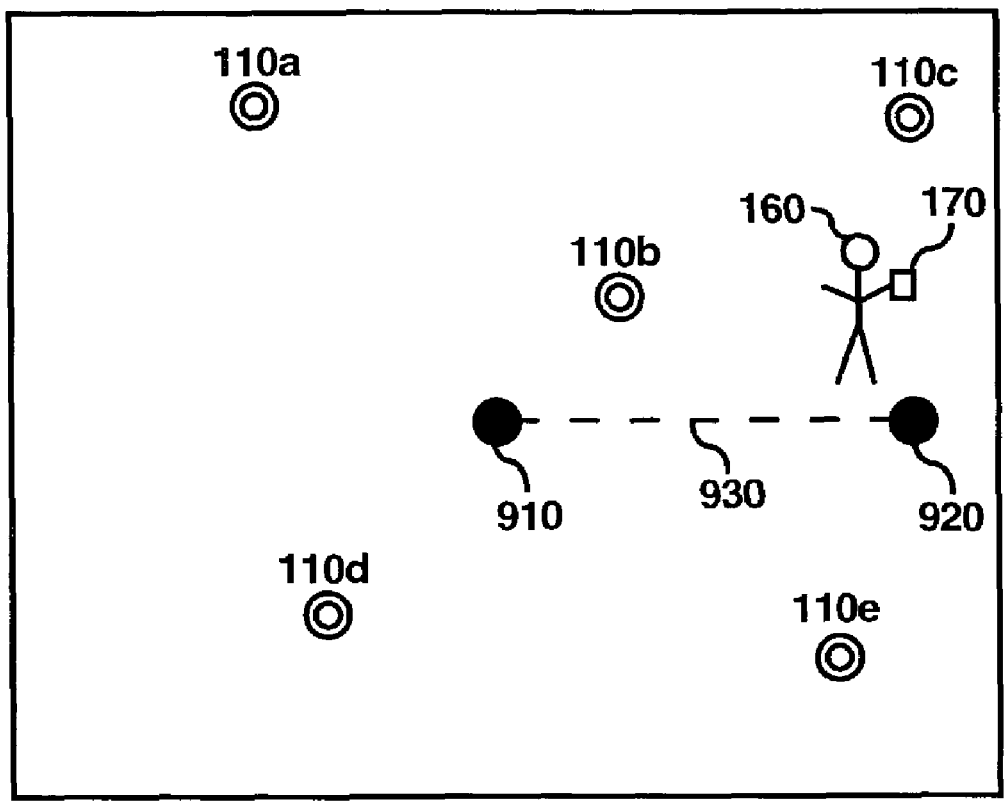
Figure 9D:
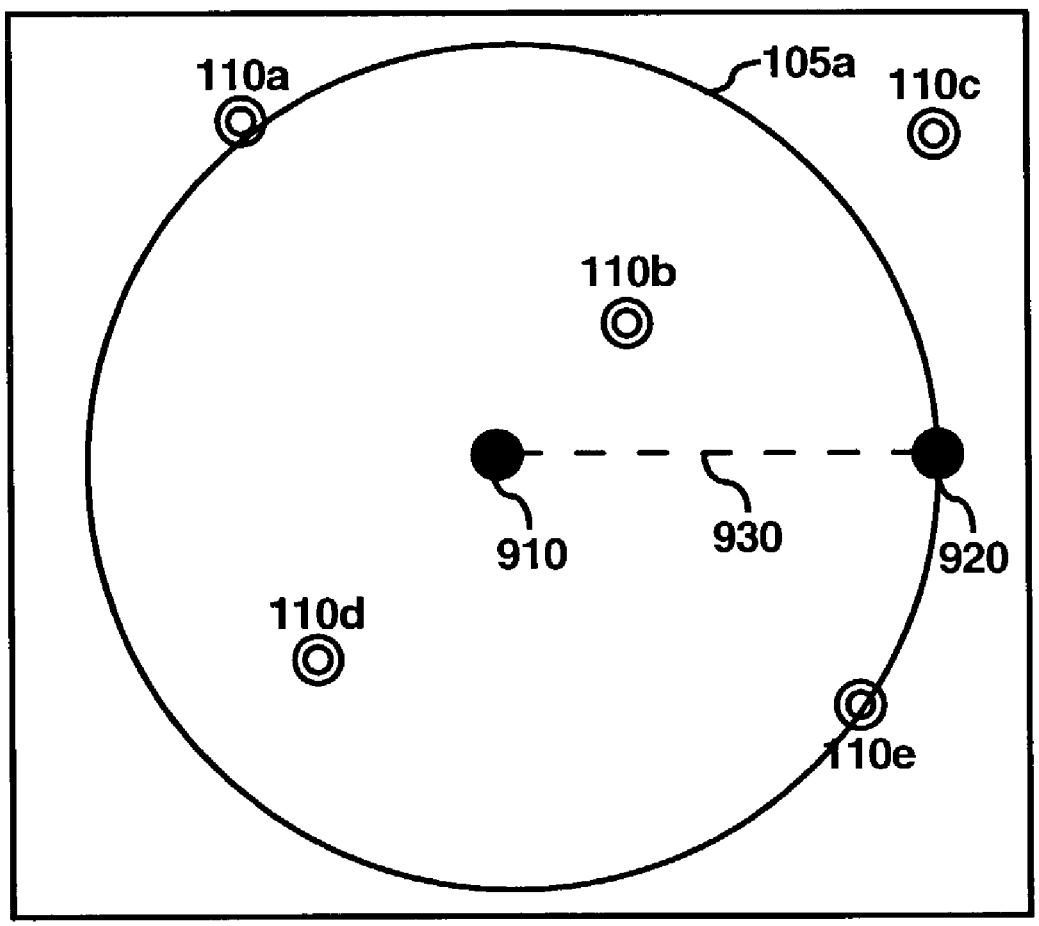

As shown in FIG. 9B, the administrator 160 moves to a location 910, substantially in a center of the smart area being defined. At the location 910, the administrator 160 transmits location information to the smart area manager 140. In FIG. 9C, the administrator 160 moves a distance 930 from the location 910. The distance 930 may include a distance from the location 910 to a location 920, which may be a location on the border being defined. The geometric figure is selected, and the border of the smart are being defined is determined based on the selected geometric figure and the distance. For example, the geometric figure selected is a circle. The area of the circle is calculated based on the distance 930, and the border of the smart area 105 being defined is the border of the circle, whereby the center of the circle is the location 910. Other geometric figures may be selected. For example, a square may be used similarly to a circle. A rectangle may be used and the administrator may define two distances related to a length and a width of the rectangle for defining the border of a smart area.

Figure 10:
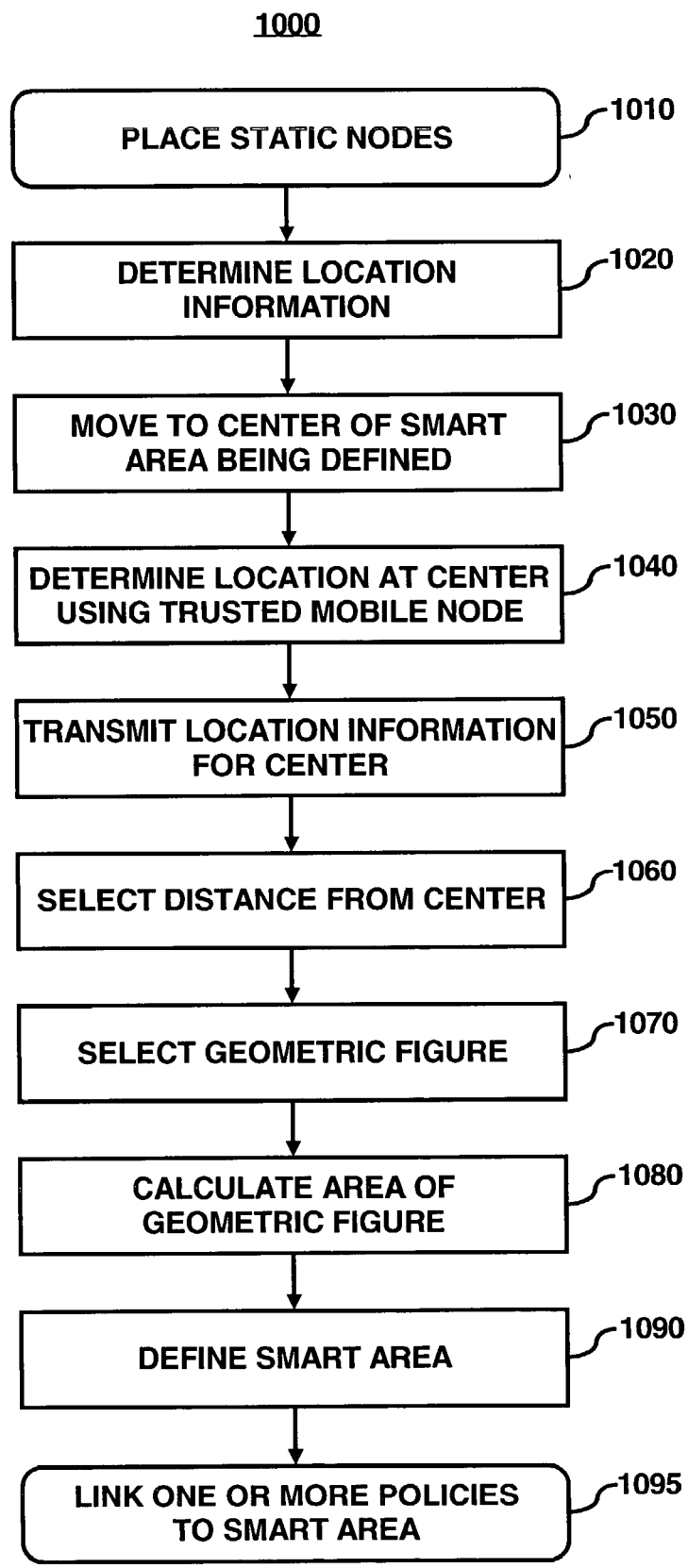
FIG. 10 illustrates a flow diagram of a method for creating a smart area, according to the embodiment shown in FIGS. 9A-D.

FIG. 10 illustrates a method 1000 for defining smart areas, according to the embodiment of the invention shown in FIGS. 8A-D. In step 1010, static nodes (e.g., the static nodes 110a . . . e) are placed. In step 1020, location information is determined for each static node.

In step 1030, the administrator 160 moves to a location substantially at a center of the smart area being defined with the trusted mobile node 170 of FIG. 1. In step 1040, location information is determined for that location substantially at the center of the smart area being defined. For example, the trusted mobile node 170 obtains its location information from static nodes. In step 1050, the location information is transmitted to the smart area manager 140.

In step 1060, the administrator 160 selects at least one distance from the location substantially at the center. For example, the administrator 160 moves to another location. This location may be on a border of the smart area being defined. The administrator 160 determines location information for this location using the trusted mobile node 170 and transmits the location information to the smart area manager 140. The distance is from the location substantially at the center of the smart area being defined to the location on a border of a smart area being defined.

In step 1070, the administrator 160 selects a geometric figure, for example, using the interface 145 of FIG. 1. In step 1080, an area of the geometric figure is calculated using the distance. In step 1090, the smart area is defined based on the geometric figure. For example, the geometric figure substantially becomes the smart area. Thus, the area of the geometric figure is the area of the smart area, and the center of the geometric figure is the center of the smart area, such as determined at step 1040. Also, the border of the geometric figure is the border of the smart area. In step 1095, one or more policies are linked to the defined smart area.

In step 1060 more than one distance may be selected if more than one distance is needed to calculate the area of the selected geometric figure. Also, certain steps of the method 1000 may be performed in an order different than described above. For example, the geometric figure may be selected before determining the distance. Also, some or all of the steps in the method 1000 may be repeated for defining multiple smart areas. For example, steps 1030-1095 may be repeated for each smart area being defined.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method for defining a smart area in an area having a plurality of nodes and wherein one or more electronic services are operable to be provided in the smart area, the method comprising steps of:

determining location information for each of the plurality of nodes based on a coordinate system defined by the plurality of nodes, wherein the plurality of nodes communicate with each other to generate the coordinate system;

determining location information for a border of a smart area being defined using a mobile node by moving the mobile node along a path, the path being associated with the border of the smart area; and periodically transmitting location information of the mobile node as the mobile node moves along the path; and defining the border for the smart area based on the location information periodically transmitted by matching a shape of the path to a closest geometric figure resembling the shape of the path based on the location information transmitted as the mobile node moves along the path; and determining the border of the smart area based on the closest geometric figure resembling the shape of the path.

2. The method of claim 1, further comprising linking at least one policy with the smart area.

3. The method of claim 2, wherein the at least one policy is at least one condition on the one or more electronic services provided in the smart area.

4. The method of claim 1, further comprising a step of placing the plurality of nodes in the area.

5. The method of claim 1, wherein the plurality of nodes are static nodes operable to be placed at one location for an extended period of time.

6. The method of claim 1, wherein the step of determining location information for a border of a smart area further comprises determining location information for corners of the smart area.

7. The method of claim 6, wherein the step of determining location information for corners of the smart area further comprises steps of:
    moving the mobile node to each corner of the corners of the border of the smart area; and
    determining location information for the mobile node at each corner of the corners of the smart area.

8. The method of claim 6, wherein the step of defining the border for the smart area further comprises defining the border for the smart area based on the location information for the mobile node at each corner of the corners of the smart area.

9. The method of claim 1, wherein the step of periodically transmitting location information further comprises substantially continuously transmitting location information of the mobile node as the mobile node moves along the path.

10. The method of claim 1, wherein the border substantially resembles the geometric figure.

11. A method for defining a smart area in an area having a plurality of nodes and wherein one or more electronic services are operable to be provided in the smart area, the method comprising steps of:
    determining location information for each of the plurality of nodes based on a coordinate system defined by the plurality of nodes, wherein the plurality of nodes communicate with each other to generate the coordinate system;
    moving the mobile node to a first location within the smart area being defined, wherein the first location is approximately at a center of the smart area being defined;
    determining location information for the mobile node at the first location;
    moving the mobile node to at least one point on a border of the smart area being defined;
    determining location information for the mobile node at each of the points;
    selecting a non-circular geometric figure, wherein the first location of the mobile node is approximately a center of the non-circular geometric figure; and
    calculating an area of the non-circular geometric figure based on the determined locations for the mobile node, wherein the area of the non-circular geometric figure is an area of the smart area.

12. A system for determining a smart area, the system comprising:
    a plurality of static nodes, wherein the plurality of static nodes communicate with each other to generate a coordinate system;
    at least one mobile node, wherein the at least one mobile node communicates with one or more of the plurality of static nodes to obtain location information for the at least one mobile node within the coordinate system generated by the plurality of static nodes; and
    a smart area manager connected to the plurality of static nodes and the at least one mobile node via a network, wherein the smart area manager is operable to determine a border for the smart area based on location information received from one or more of at least some of the plurality of static nodes and the at least one mobile node,
    wherein the location information is received from the at least one mobile node periodically transmitting location information as the mobile node moves along a path associated with a border of the smart area being defined, and wherein the closest geometric figure matching the shape of the path is computed to complete the path and define the smart area.

13. The system of claim 12, wherein the location information is received from at least some of the plurality of static nodes placed at corners of the smart area being defined.

14. The system of claim 12, wherein the location information is received from the at least one mobile node transmitting location information from corners of the smart area being defined.

15. The system of claim 12, wherein the network comprises at least a wireless network.

16. A system for defining a smart area in an area having a plurality of nodes and wherein one or more electronic services are operable to be provided in the smart area, the system comprising:
    means for determining location information for each of the plurality of nodes based on a coordinate system defined by the plurality of nodes, wherein the plurality of nodes communicate with each other to generate the coordinate system;
    means for determining location information for a border of a smart area being defined using a mobile node by
        moving the mobile node along a path, the path being associated with the border of the smart area; and
        periodically transmitting location information of the mobile node as the mobile node moves along the path; and
    means for matching a shape of the path to a closest geometric figure resembling the shape of the path based on the location information periodically transmitted from the mobile node; and
    means for determining the border of the smart area based on the geometric figure.

17. The system of claim 16, further comprising linking means for linking at least one policy with the smart area.

18. The system of claim 17, wherein the at least one policy is at least one condition on the one or more electronic services provided in the smart area.

19. The system of claim 16, wherein the means for determining location information for a border of a smart area further comprises means far determining location information for corners of the smart area.

20. The system of claim 19, wherein the means for determining location information for corners of the smart area further comprises:
    means for moving the mobile node to each corner of the corners of the border of the smart area; and
    means for determining location information for the mobile node at each corner of the corners of the smart area, wherein the border for the smart area is based on the location information for the mobile node at each corner of the corners of the smart area.

* * * * *

UNITED STATES PATENT AND TRADEMARK OFFICE
CERTIFICATE OF CORRECTION

PATENT NO. : 7,398,090 B2
APPLICATION NO. : 10/242366
DATED : July 8, 2008
INVENTOR(S) : Cyril Brignone et al.

It is certified that error appears in the above-identified patent and that said Letters Patent is hereby corrected as shown below:

On the Title Pg, Item (75), in "Inventors", delete "Marc McMeachern" and insert -- Marc McEachem --, therefor.

In column 4, line 63, delete "10a" and insert -- 110a --, therefor.

In column 10, line 54, in Claim 19, delete "far" and insert -- for --, therefor.

Signed and Sealed this

Thirtieth Day of June, 2009

JOHN DOLL
*Acting Director of the United States Patent and Trademark Office*